United States Patent
Jeong et al.

(10) Patent No.: US 9,465,462 B2
(45) Date of Patent: Oct. 11, 2016

(54) DISPLAY DEVICE INTEGRATED WITH TOUCH SCREEN PANEL

(71) Applicant: Samsung Display Co., Ltd., Yongin, Gyeonggi-do (KR)

(72) Inventors: Hwan-Hee Jeong, Yongin (KR); Deok-Jung Kim, Yongin (KR); Mi-Kyoung Seo, Yongin (KR); In-Young Han, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 129 days.

(21) Appl. No.: 14/157,408

(22) Filed: Jan. 16, 2014

(65) Prior Publication Data

US 2014/0198267 A1  Jul. 17, 2014

(30) Foreign Application Priority Data

Jan. 17, 2013  (KR) .......................... 10-2013-0005456

(51) Int. Cl.
*G06F 3/041* (2006.01)

(52) U.S. Cl.
CPC ..................... *G06F 3/041* (2013.01)

(58) Field of Classification Search
CPC ...................................................... G06F 3/041
USPC ................... 349/12; 345/173, 174
See application file for complete search history.

(56) References Cited

U.S. PATENT DOCUMENTS

| | | | |
|---|---|---|---|
| 2008/0062140 A1* | 3/2008 | Hotelling | G09G 3/3648 345/173 |
| 2008/0143683 A1* | 6/2008 | Hotelling | G06F 3/0416 345/173 |
| 2008/0246741 A1* | 10/2008 | Hinata | G06F 3/045 345/173 |
| 2010/0001930 A1* | 1/2010 | Koyama | 345/76 |
| 2010/0072482 A1* | 3/2010 | Eom et al. | 257/72 |
| 2010/0128198 A1* | 5/2010 | Kim et al. | 349/61 |
| 2010/0172028 A1* | 7/2010 | Kamei | G02B 5/0226 359/609 |
| 2011/0134056 A1* | 6/2011 | Kim | G06F 3/0412 345/173 |
| 2012/0105344 A1* | 5/2012 | Ko et al. | 345/173 |
| 2012/0127095 A1* | 5/2012 | Jun | G06F 3/044 345/173 |
| 2012/0242606 A1* | 9/2012 | Mackey | G06F 3/044 345/173 |
| 2013/0300678 A1* | 11/2013 | Kang | G06F 3/044 345/173 |
| 2014/0028582 A1* | 1/2014 | Choi | G06F 3/041 345/173 |

FOREIGN PATENT DOCUMENTS

| | | |
|---|---|---|
| KR | 2010-0034876 A | 4/2010 |
| KR | 10-2011-0127429 A | 11/2011 |
| KR | 10-1082162 B1 | 11/2011 |
| KR | 10-2012-0045292 A | 5/2012 |

* cited by examiner

*Primary Examiner* — Sang V Nguyen
(74) *Attorney, Agent, or Firm* — Knobbe Martens Olson & Bear LLP

(57) ABSTRACT

A display device integrated with a touch screen panel includes a lower substrate; an upper substrate opposing the substrate and comprising a major surface facing away from the lower substrate, each of the upper and lower substrates being divided into a display area and a non-display area formed outside the display area when viewed in a viewing direction perpendicular to the major surface; sensing cells formed over the display area of the upper substrate; sensing lines formed over the non-display area of the upper substrate and electrically connected to the sensing cells; and a sealing material formed between the non-display areas of the upper and lower substrates. In the display device, at least one of the sensing lines comprises a portion overlapping the sealing material when viewed in the viewing direction, and the overlapping portion is formed of a transparent conductive material or metal mesh.

18 Claims, 3 Drawing Sheets

DISPLAY DEVICE INTEGRATED WITH TOUCH SCREEN PANEL

RELATED APPLICATIONS

This application claims priority to and the benefit of Korean Patent Application No. 10-2013-0005456, filed on Jan. 17, 2013, in the Korean Intellectual Property Office, the entire content of which is incorporated herein by reference.

BACKGROUND

1. Field

An aspect of the present disclosure relates to a display device, and more particularly, to a display device integrated with a touch screen panel.

2. Discussion of the Related Technology

A touch screen panel is an input device that allows a user's instruction to be input by selecting an instruction content displayed on a screen of a display device or the like with a user's hand or object.

To this end, the touch screen panel is formed on a front face of the display device to convert a contact position into an electrical signal. Here, the user's hand or object is directly in contact with the touch screen panel at the contact position. Accordingly, the instruction content selected at the contact position is input as an input signal to the image display device.

Since such a touch screen panel can be substituted for a separate input device connected to a display device, such as a keyboard or mouse, its application fields have been gradually extended.

Touch screen panels are divided into a resistive overlay touch screen panel, a photosensitive touch screen panel, a capacitive touch screen panel, and the like. Among these touch screen panels, the capacitive touch screen panel converts a contact position into an electrical signal by sensing a change in capacitance formed between a conductive sensing cell and an adjacent sensing cell or ground electrode when a user's hand or object comes in contact with the touch screen panel.

The touch screen panel is generally configured to be separately manufactured and then attached to an outer face of a display device such as a liquid crystal display device or organic light emitting display device. In a case where the manufactured touch screen panel and the display device are attached to each other, the entire thickness of a product is increased, and manufacturing cost is increased.

As a display area on which images are displayed is maximized, a non-display area positioned at the outside of the display area, i.e., a dead space has recently been minimized.

Accordingly, in order to form sensing lines of a touch screen panel in the narrow non-display area, the width and interval of the sensing lines are decreased. Therefore, the resistance of the sensing lines is increased, and a short circuit between the sensing lines occurs.

SUMMARY

Embodiments provide a display device integrated with a touch screen panel directly formed on an upper substrate of the display device, in which some of the sensing lines arranged on a non-display area of the touch screen panel are formed on a second non-display area on which a sealing material sealing the upper substrate and a lower substrate is coated, and the sensing lines formed on the second non-display area is formed of a transparent conductive material or metal mesh.

According to an aspect of the present invention, there is provided a display device integrated with a touch screen panel, including: a lower substrate; an upper substrate opposing the substrate and comprising a major surface facing away from the lower substrate, each of the upper and lower substrates being divided into a display area and a non-display area formed outside the display area when viewed in a viewing direction perpendicular to the major surface; a plurality of sensing cells formed over the display area of the upper substrate; a plurality of sensing lines formed over the non-display area of the upper substrate and electrically connected to the plurality of sensing cells; and a sealing material formed between the non-display areas of the upper and lower substrates, wherein at least one of the sensing lines comprises a portion overlapping the sealing material when viewed in the viewing direction, and the overlapping portion of the at least one of the sensing lines is formed of a transparent conductive material or metal mesh.

The non-display area may be divided into a first non-display area adjacent to the display area, and a second non-display area positioned outside the first non-display area when viewed in the viewing direction, wherein the sealing material is formed to overlap the second non-display area when viewed in the viewing direction.

The second sensing lines may include first sensing lines arranged over the first non-display area, and second sensing lines arranged over the second non-display area when viewed in the viewing direction. Each of the second sensing lines may comprise a first connection portion electrically connected to one of the plurality of sensing cells, and a second connection portion electrically connected to the first connection portion and formed to overlap the sealing material when viewed in the viewing direction.

The second connection portion may be made of a transparent conductive material. The second connection portion may be formed in the shape of a metal mesh implemented with fine lines.

The first connection portion may be formed of the same material as the first sensing lines. The first connection portion and the first sensing lines may be made of an opaque low-resistance metal material.

The plurality of sensing cells may include: first sensing cells arranged in row lines extending along a first direction; first connecting lines, each connecting immediately neighboring two of the first sensing cells arranged in one of the row lines; second sensing cells arranged in column lines extending along a second direction; and second connecting lines, each connecting immediately neighboring two of the second sensing cells arranged in one of the column lines.

The plurality of sensing cells may be formed on the same layer. The second sensing cells may be integrally formed with the second connecting lines.

The display device may further include an insulation layer interposed between the first and second connecting lines.

The plurality of sensing cells may be formed on the major surface of the upper substrate. The upper substrate may be a sealing substrate of the foregoing display device which is an organic light emitting display device.

The display device may further include a polarizing film disposed over the upper substrate, wherein the sensing cells and the sensing lines are formed between the polarizing film and the upper substrate; and a window substrate disposed over the polarizing film.

A black matrix layer may be formed over an area of the window substrate, overlapping the non-display area when viewed in the viewing direction.

The polarizing film may comprise a polarizer, a retardation compensation layer, and a transparent adhesive layer attaching the retardation compensation layer to the polarizer, and is flexible.

The window substrate may be formed of at least one selected from the group consisting of polymethyl methacrylate (PMMA), acryl and polyester (PET).

As described above, according to embodiments of the present invention, in the touch screen panel formed on the upper substrate of the display device, some of the sensing lines arranged on the non-display area of the touch screen panel are formed on the second non-display area on which the sealing material sealing the upper and lower substrates of the display device, and the sensing lines formed on the second non-display area are formed of a transparent conductive material or metal mesh, so that it is possible to avoid the increase in resistance of the sensing lines and the short circuit between the sensing lines due to the reduction of a dead space while minimizing a decrease in peeling force between the substrates due to the non-curing of the sealing material.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
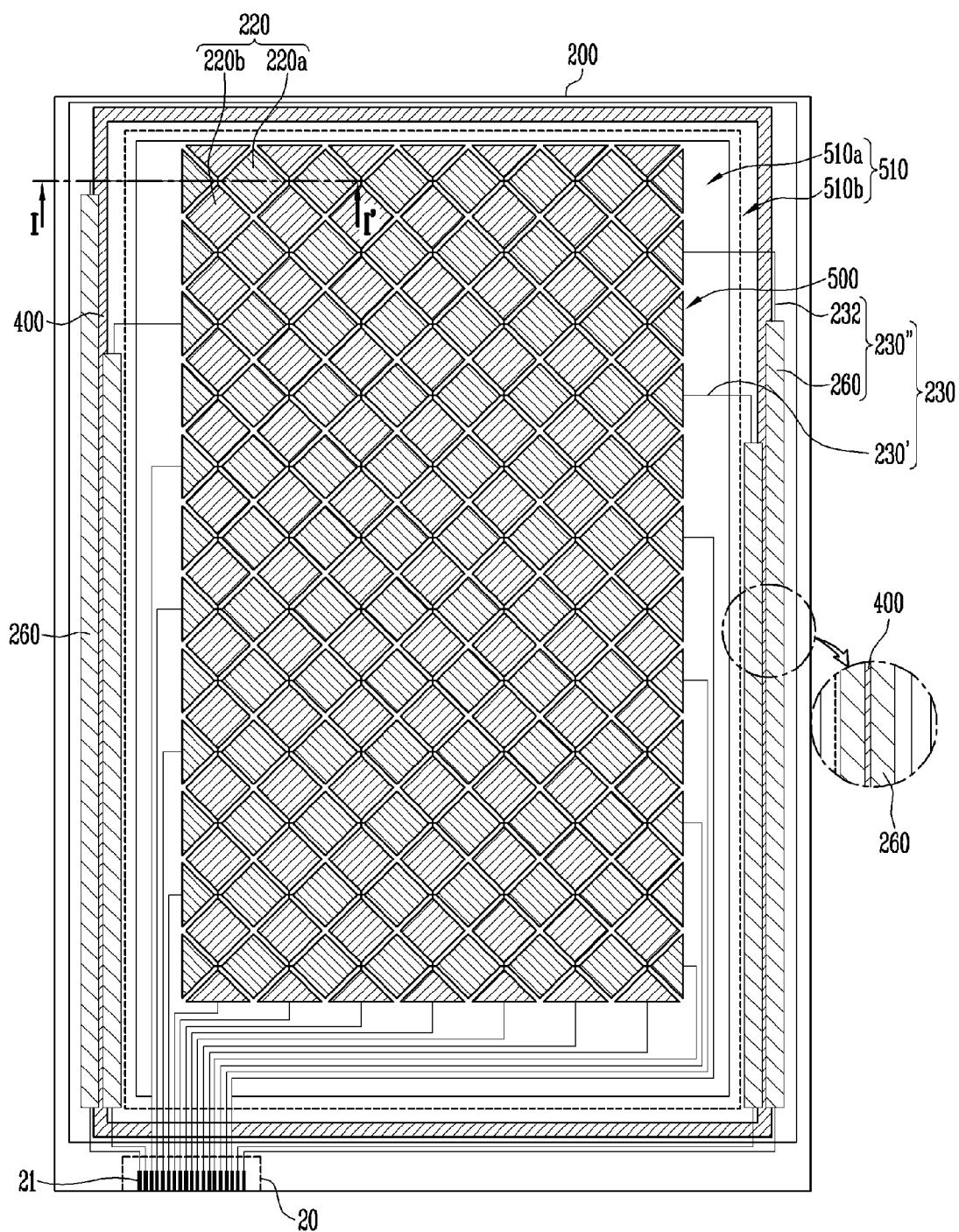
FIG. 1 is a plan view showing an upper substrate of a display device integrated with a touch screen panel according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements.

Figure 2:
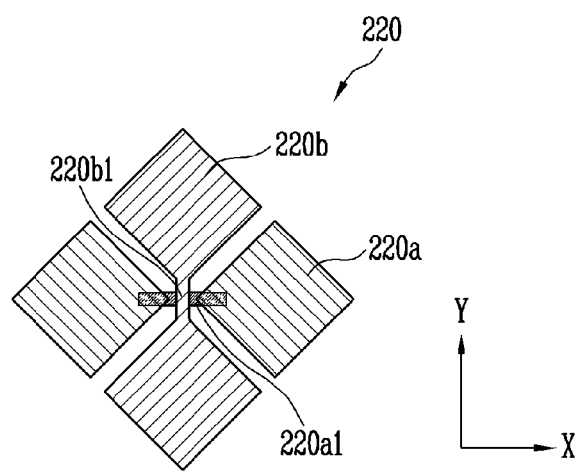
FIG. 2 is a main part enlarged view showing an example of a sensing cell shown in FIG. 1.

FIG. 1 is a plan view showing an upper substrate of a display device integrated with a touch screen panel according to an embodiment of the present invention. FIG. 2 is a main part enlarged view showing an example of a sensing cell or electrode cell shown in FIG. 1.

The embodiment of the present invention provides a display device integrated with a touch screen panel, in which the touch screen panel is directly formed on one major surface of an upper substrate 200 of the display device.

In this case, the major surface of the upper substrate 200 is the outer surface of the upper substrate 200 facing away from a lower substrate 100. (See FIG. 3) That is, FIG. 1 is a plan view showing the outer surface of the upper substrate 200 of the display device according to the embodiment of the present invention.

This display device is an embodiment according to the present invention, and the present invention is not limited thereto. That is, the touch screen panel may be formed on an inner surface of the upper substrate 200. Alternatively, first sensing cells 220a included in sensing cells 220 of the touch screen panel may be formed on the inner surface of the upper substrate 200, and second sensing cells 220b alternately arranged not to overlap with the first sensing cells 220a may be formed on the outer surface of the upper substrate 200.

The display device may be an organic light emitting display device or liquid crystal display device. In this embodiment, the organic light emitting display device will be described as an example of the display device.

Accordingly, the upper substrate 200 is a sealing substrate of the organic light emitting display device. The upper substrate 200 may be made of a transparent material.

In a case where the organic light emitting display device has flexibility, the upper substrate 200 may be made of a film material (e.g., a polyimide material) having flexibility, or may be implemented with a plurality of thin film layers.

The touch screen panel according to this embodiment, as shown in FIG. 1, includes sensing cells 220 formed on an upper surface of a transparent substrate performing the function of the upper substrate 200, i.e., the sealing substrate, and sensing lines or conductive connection lines 230 connecting the sensing cells 220 to an external driving circuit (not shown) through a bonding pad portion 20.

In this case, the area on which the plurality of sensing cells 220 are formed becomes a display area 500 on which an image is displayed to detect a touch position, and the area on which the sensing lines 230 electrically connected to the sensing cells 220 and the bonding pad portion 20 are formed becomes a non-display area 510 provided at the outside of the display area 500.

In this embodiment, the non-display area 510 is divided into a first non-display area 510a adjacent to the display area 500, and a second non-display area 510b positioned at the outside of the first non-display area 510a and on which the bonding pad portion 20 including a plurality of bonding pads 21 connected to the respective sensing lines 230 is formed.

Here, the second non-display area 510b is an area on which a sealing material 400 formed between the upper substrate 200 and a lower substrate 100 (see FIG. 3) is coated so that the upper and lower substrates 200 and 100 of the organic light emitting display device are bonded together. In this case, the upper and lower substrates 200 and 100 are bonded together by irradiating laser onto the second non-display area 510b and curing the sealing material 400.

Recently, the display area performing image display and touch recognition has been maximally expanded. Accordingly, the width of the non-display area 510 positioned at the outside of the display area 500 is considerably narrowed.

In this case, there is a limitation in narrowing the width of the second non-coating area 510b that is a coating area of the sealing material 400 so as to bond together the upper and lower substrates. Hence, the width of the first non-display area 510a having the sensing lines 230 arranged thereon is narrowed. As the width of the first non-display area 510a is narrowed, the width and interval of the sensing lines 230 are also narrowed. Therefore, the resistance of the sensing lines is increased, and a short circuit between the sensing lines occurs.

If the sensing lines 230 are extended up to the second non-display area 510b by widening the width and interval of the sensing lines 230, some of the sensing lines 230 overlap with the sealing material 400 coated on the second non-display area 510b. In this case, the sealing material 400 is not cured with respect to the area overlapping with the sensing lines in a subsequent process of curing the sealing material 400 using laser, and therefore, a failure of the bonding of the upper and lower substrates may occur.

To avoid the foregoing, in this embodiment, some 230" of the sensing lines 230 arranged on the non-display area 510 is formed on the second non-display area 510b on which the sealing material 400 sealing the upper and lower substrates of the display device is coated, and the sensing lines 230" formed on the second non-display area 510b is made of a transparent conductive material 260. Accordingly, it is possible to avoid the increase in resistance of the sensing lines and the short circuit between the sensing lines while minimizing a decrease in peeling force between the substrates due to the non-curing of the sealing material 400.

The structure of the touch screen panel according to this embodiment will be described in detail with reference to FIGS. 1 and 2.

The sensing cells 220, as shown in FIG. 2, include a plurality of first sensing cells 220a formed to be connected for each row line along a first direction (X-axis direction), a plurality of first connecting lines 220a1 connecting the first sensing cells 220a along the first direction, a plurality of second sensing cells 220b formed to be connected for each column line along a second direction (Y-axis direction), and a plurality of second connecting lines 220b1 connecting the second sensing cells 220b along the second direction.

The first sensing cells 220a and the second sensing cells 220b are alternately arranged so as not to overlap with each other, and the first connecting lines 220a1 and the second connecting lines 220b1 intersect each other. In this case, an insulation layer (not shown) for securing stability is interposed between the first connecting lines 220a1 and the second connecting lines 220b1.

Meanwhile, the first sensing cells 220a may be integrally formed with the first connecting lines 220a1 using a transparent conductive material such as indium tin oxide (hereinafter, referred to as ITO) or may be formed separately from the first connecting lines 220a1 so that the first sensing cells 220a and the first connecting lines 220a1 are electrically connected to each other. The second sensing cells 220b may be integrally formed with the second connecting lines 220b1 using a transparent conductive material such as ITO or may be formed separately from the second connecting lines 220b1 so that the second sensing cells 220b and the second connecting lines 220b1 are electrically connected to each other.

For example, the second sensing cells 220b are integrally formed with the second connecting lines 220b1 by being patterned in the second direction. The first sensing cells 220a are patterned to respectively independent patterns between the second sensing cells 220b, and may be connected along the first direction by the first connecting lines 220a1 positioned above or below the first sensing cells 220a.

In this case, the first connecting lines 220a1 may be electrically connected to the first sensing cells 220a by being directly contacted with the first sensing cells 220a above or below the first sensing cells 220a. Alternatively, the first connecting lines 220a1 may be electrically connected to the first sensing cells 220a through contact holes, etc.

The first connecting lines 220a1 may be formed using a transparent conductive material such as ITO or using an opaque low-resistance metal material. The first connecting lines 220a1 may be formed by adjusting their width, etc. so that the visibility of the patterns is prevented or minimized.

The sensing lines 230 are electrically connected to row lines of the first sensing cells 220a and column lines of the second sensing cells 220b, respectively, so as to connect the row and column lines to the external driving circuit (not shown) such as a position detecting circuit through the bonding pad portion 20.

In this embodiment, the sensing lines 230 are arranged on the first non-display area 510a and the second non-display area 510b.

In the embodiment shown in FIG. 1, two sensing lines 230" arranged at the leftmost and rightmost outsides among the sensing lines 230 are arranged on the second non-display area 510b, and the other sensing lines 230' are arranged on the first non-display area 510a. However, this is merely one embodiment, and the configuration of the present invention is not limited thereto.

That is, the second sensing lines 230" arranged in the second non-display area 510b are one or more sensing lines 230. In a case where the width of the first non-display area 510a is narrowed, most of the sensing lines 230 may be arranged on the second non-display area 510b.

In this case, the material of the sensing lines 230' arranged on the first non-display area 510a is selected in a wide range. Hence, the sensing lines 230' may be formed of not only a transparent electrode material used to form the sensing cells 220 but also a low-resistance metallic material such as molybdenum (Mo), silver (Ag), titanium (Ti), copper (Cu), aluminum (Al) or Mo/Al/Mo.

On the other hand, if the sensing lines 230" arranged on the second non-display area 510b are formed of an opaque low-resistance metal material, the laser cannot be transmitted through the sensing lines formed in the area overlapping with the sealing material 400, and therefore, the sealing material 400 is not cured on the overlapping area.

Thus, in the embodiment shown in FIG. 1, the second sensing lines 230" formed on the second non-display area 510b are formed with a connection extension or second connection portion 260 made of the transparent conductive material with respect to the area overlapping with the sealing material 400.

Here, the second sensing lines 230" are provided with a connection portion 232 for electrical connection with the first sensing cells 220a formed on the display area 500, corresponding to the second sensing lines 230". The connection portion 232 is also connected to the bonding pad portion 20 positioned at the lower-end of the touch screen panel as shown in FIG. 1.

In this case, the connection portion 232 may be formed of the same material through the same process as the sensing lines 230'.

That is, the sensing lines 230" include the connection portion 232 connected to the first sensing cells 220a and the bonding pad portion 20, and the connection extension that is the transparent material contacted with the connection portion 232 through a contact hole (not shown) and formed in the area overlapping with the sealing material 400 on the second non-display area 510b.

The touch screen panel described above is a capacitive touch screen panel. If a contact object such as a user's finger or stylus pen comes in contact with the touch screen panel, a change in capacitance caused by a contact position is transferred from the sensing cells 220 to the driving circuit (not shown) via the sensing lines 230 and the bonding pad portion 20. Then, the change in capacitance is converted into an electrical signal by X and Y input processing circuits (not shown), thereby detecting the contact position.

Figure 3:
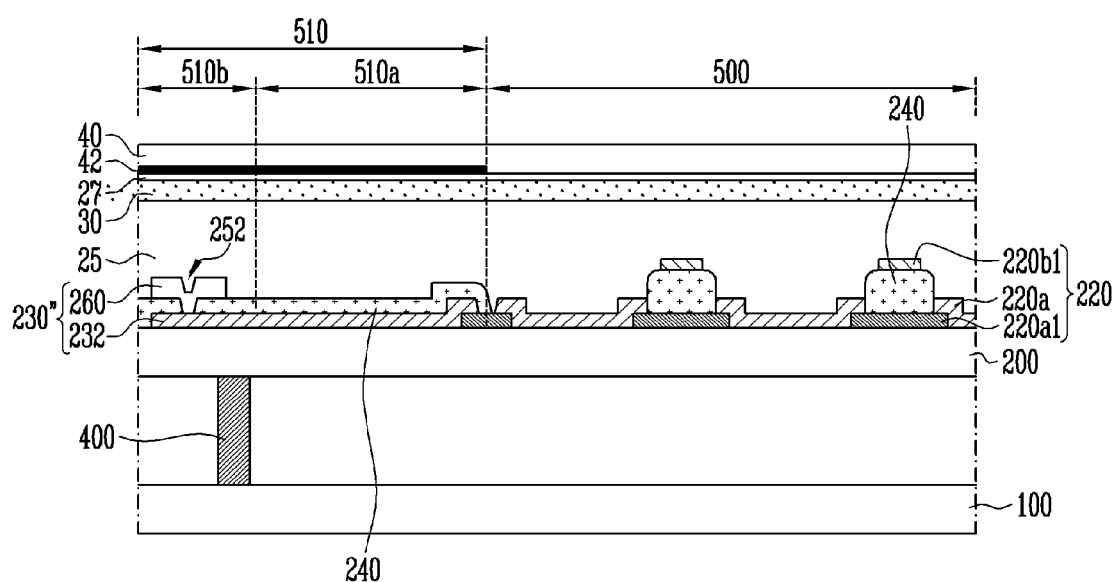
FIG. 3 is a sectional view showing one area (IT) of the display device integrated with the touch screen panel shown in FIG. 1.

FIG. 3 is a sectional view showing one area (I-I') of the display device integrated with the touch screen panel shown in FIG. 1. The one area (I-I') represents the first and second non-display areas 510*a* and 510*b* and a portion of the display area 500.

Referring to FIG. 3, the sensing cells 220 formed on the display area 500 of the upper substrate 200 include the first sensing cells 220*a* formed to be connected for each row line along the first direction, the first connecting lines 220*a*1 connecting the first sensing cells 220*a* along the first direction, the second sensing cells 220*b* formed to be connected for each column line along the second direction, and the second connecting lines 220*b*1 connecting the second sensing cells 220*b* along the second direction. An insulation layer 240 is interposed between the first and second connecting lines 220*a*1 and 220*b*1 intersecting each other.

The thicknesses of the components such as the sensing cells 220, constituting the touch screen panel, are exaggerated in FIG. 3. However, this is for the purpose of convenience of illustration. Practically, the thickness of each component is much thinner than that shown in FIG. 3.

Although not shown in FIG. 3, the sensing lines 230' electrically connected to the sensing cells 220 as described in FIGS. 1 and 2 are formed on the first non-display area 510*a* of the upper substrate 200 positioned at the outside of the display area 500.

The sealing material 400 for the bonding of the upper substrate 200 with the lower substrate 100 is, formed on the lower surface of the second non-display area 510*b* positioned at the outside of the first non-display area 510*a*.

In this case, although not shown in FIG. 3, a plurality of pixels each having an organic light emitting element, a thin film transistor and the like are formed on the display area 500 of the lower substrate 100. Signal lines (scan and data signal lines) connected to the pixels so as to provide predetermined signals are formed on the first non-display area 510*b*, and the sealing material 400 is formed on the second non-display area 510*b*.

In this embodiment, the sensing lines 230 are not arranged only on the first non-display area 510*a* but arranged on the second non-display area 510*b*.

That is, the sensing lines 230" arranged on the second non-display area 510*b* are one or more sensing lines 230. The sensing lines 230" include the connection portion 232 connected to the first sensing cells 220*a* corresponding to the second sensing lines, and the connection extension 260 that is the transparent conductive material contacted with the connection portion 232 through a contact hole 252 formed in the insulation layer 240 and formed in the area overlapping with the sealing material 400 on the second non-display area 510*b*.

In other words, the connection extension 260 made of the transparent conductive material is formed on the insulation layer 240 of the second non-display area 510*b*. The connection extension 260 is implemented into a structure in which the connection extension 260 directly contacts the connection portion 232 through the contact hole 252 formed in the insulation layer 240 overlapping with the connection portion 232.

That is, the laser can be transmitted through the connection extension 260 formed in the area overlapping with the sealing material 400 through the configuration described above, so that it is possible to overcome the disadvantage in that the sealing member 400 is not cured in the bonding of the upper and lower substrates, and to sufficiently secure the entire width of the second sensing lines 230". Accordingly, it is possible to avoid the increase in resistance of the sensing lines and the short circuit between the sensing lines due to the reduction of a dead space while minimizing a decrease in peeling force between the substrates due to the non-curing of the sealing material 400.

In the embodiment of FIG. 3, the connection extension 260 is formed on the insulation layer 240, and the connection portion 232 is formed beneath the insulation layer 240. However, the embodiment of the present invention is not necessarily limited thereto. That is, the connection extension may be formed beneath the insulation layer, and the connection portion may be formed on the insulation layer so that the connection extension and the connection portion are electrically connected to each other through the contact hole formed in the insulation layer overlapping therewith.

In this embodiment, a polarizing film 30 is further provided on an upper surface of the touch screen panel in order to improve problems of transparency and reflectivity of the sensing cells 220, caused by that the touch screen panel is directly formed on the upper substrate 100 of the display device.

That is, in this embodiment, the touch screen panel is positioned between the display device and the polarizing film 30, so that it is possible to prevent the transparency and reflectivity of the sensing cells.

In a case where the display device is implemented as the organic light emitting display device having flexibility, the polarizing film 30 is also implemented to have flexibility.

To this end, the polarizing film 30 according to this embodiment may be implemented into a stacked structure of a polarizer, a transparent adhesive layer and a retardation compensation layer by removing a support layer made of a triacetyl cellulose (TAC) material, which is included in an existing polarizing plate. Accordingly, the polarizing film 30 can obtain flexibility, i.e., high bendability.

The existing polarizing plate is generally implemented into a structure in which a polarizer is interposed between upper and lower support layers.

The polarizer performs a function of controlling the amount of transmitted light according to the polarized degree of incident light. The polarizer may be implemented with a film made of a poly vinyl alcohol (PVA) material. For example, the polarizer implements polarization by stretching a PVA film having iodine absorbed therein with strong tension.

The support layers respectively provided on the upper and lower surfaces of the polarizer may be implemented with a film made of a triacetyl cellulose (TAC) material for protecting and supporting the PVA film.

The polarizing plate is generally attached to the outside of a display panel in order to improve external visibility such as external light reflection blocking. In a case where the touch screen panel is attached on the display panel, the polarizing plate may be attached to the outer surface of the touch screen panel.

However, the polarizing plate and the touch screen panel necessarily pass through a process of separately manufacturing the polarizing plate and the touch screen panel and then attaching or assembling the polarizing plate and the touch screen panel. In this case, there occur disadvantages such as a decrease in process efficiency and a decrease in yield.

Particularly, in the existing polarizing plate having the stacked structure, the polarizer has a thickness of about 20 μm, and each of the upper and lower support layers has a thickness of about 80 μm. Therefore, the polarizing plate entirely has a great thickness of about 180 μm. Hence, in a case where the polarizing plate is attached to the touch screen panel as it is, the entire thickness of the touch screen panel is increased, which runs counter to the tendency of thinning of the touch screen panel.

The TAC that is a material of the existing support layer has high elasticity. Therefore, if the polarizing plate having the support layers is attached to the flexible touch screen panel, it is impossible to secure the bendability of the flexible touch screen panel.

Accordingly, to overcome such a disadvantage, the polarizing film 30 can obtain flexibility by removing the support layers provided to the existing polarizing plate and supporting and protecting the polarizer using a transparent adhesive layer.

A window substrate 40 is additionally provided on the upper surface of the polarizing film 30 for the purpose of strength improvement.

As shown in FIG. 3, a black matrix layer (decoration layer) 42 is formed on the area of the window substrate 40, overlapping with the non-display area 510. Accordingly, it is possible to perform a function of forming a frame of the display area while preventing the patterns such as sensing lines 230 formed on the non-display area 510 from being transparent.

In a case where the display device and the touch screen panel have flexibility as described above, the window substrate 40 may be made of a material having flexibility.

Therefore, in this embodiment, the window substrate 40 may be made of polymethyl methacrylate (PMMA), acryl, polyester (PET), etc., and the thickness of the window substrate 40 may be about 0.7 mm.

The polarizing film 30 and the window substrate 40 may be attached on a first surface of the upper substrate 100 by first and second transparent adhesive layers 25 and 27. Here, the first transparent adhesive layer 25 is interposed between the polarizing film 30 and the upper substrate 100, and the second transparent adhesive layer 27 is interposed between the polarizing film 30 and the window substrate 40. The first and second transparent adhesive layers 25 and 27 are made of a transparent adhesive material having high light transmittance. The first and second transparent adhesive layers 25 and 27 may be made of super view resin (SVR) or optical cleared adhesive (OCA).

Figure 4:
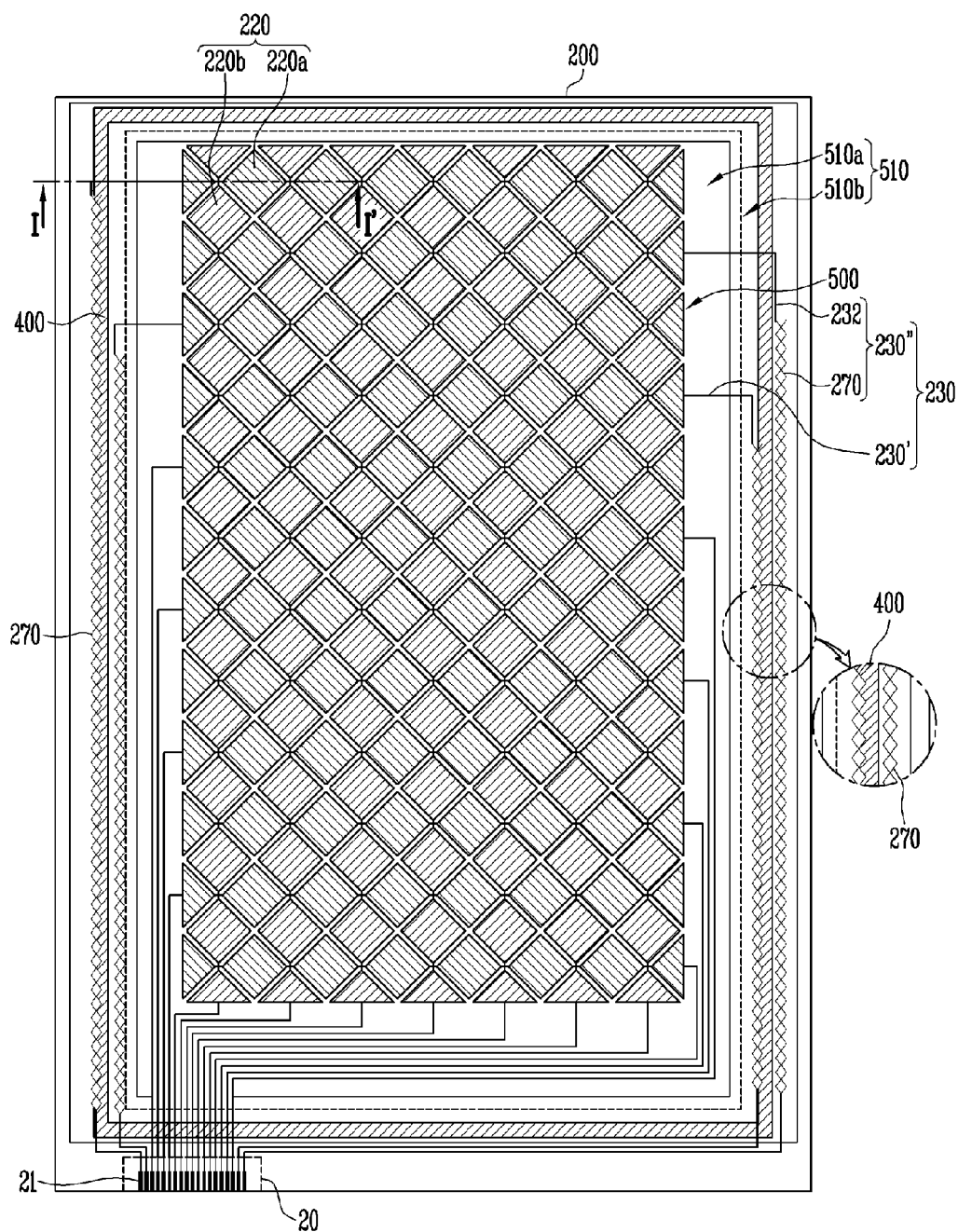
FIG. 4 is a plan view showing an upper substrate of a display device integrated with a touch screen panel according to another embodiment of the present invention.

FIG. 4 is a plan view showing an upper substrate of a display device integrated with a touch screen panel according to another embodiment of the present invention.

The embodiment shown in FIG. 4 is different from the embodiment shown in FIGS. 1 and 3 in that a connection extension 270 of the second sensing line 230" overlapping with the sealing material 400 formed on the lower surface of the upper substrate 200 of the second non-display area 510b is formed in the shape of a metal mesh implemented with metal lines rather than a transparent conductive material. The other components in the embodiment shown in FIG. 4 are all identical to those in the embodiment shown in FIGS. 1 and 3. Therefore, like components are designated by like reference numerals, and their detailed descriptions will be omitted.

Referring to FIG. 4, in this embodiment, the second sensing lines 230" formed on the second non-display area 510b are formed in the shape of a metal mesh implemented with fine metal lines on the region overlapping with the sealing material 400.

The second sensing lines 230" are provided with the connection portion 232 for electrical connection with the first sensing cells 220a formed on the display area 500 corresponding thereto. The connection portion 232 is also connected to the bonding pad portion 20 positioned at the lower end of the touch screen panel as shown in FIG. 1.

The connection portion 232 may be formed of the same material through the same process with the sensing line 230'. The connection portion 232 may be formed of not only a transparent electrode material used to form the sensing cells 220 but also a low-resistance metallic material such as molybdenum (Mo), silver (Ag), titanium (Ti), copper (Cu), aluminum (Al) or Mo/Al/Mo.

The connection extension 270 may be made of the same material as the connection portion 232, but is formed in the shape of a metal mesh including fine lines so that the laser is transmitted through the connection extension 270 formed in the area overlapping with the sealing material 400.

Through the connection extension 270 having the shape of the metal mesh, it is possible to overcome the disadvantage in that the sealing material 400 is not cured in the bonding of the upper and lower substrates, and to sufficiently secure the entire width of the second sensing line 230". Accordingly, it is possible to avoid the increase in resistance of the sensing lines and the short circuit between the sensing lines due to the reduction of a dead space while minimizing a decrease in peeling force between the substrates due to the non-curing of the sealing material 400.

While embodiments of the present invention have been described, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device integrated with a touch screen panel, comprising:
   a lower substrate;
   an upper substrate opposing the lower substrate and comprising a major surface facing away from the lower substrate, the major surface comprising a first edge, each of the upper and lower substrates being divided into a display area and a non-display area formed outside the display area when viewed in a viewing direction perpendicular to the major surface;
   a plurality of sensing cells formed over the display area of the upper substrate;
   a plurality of connection lines formed over the non-display area of the upper substrate and electrically connected to the plurality of sensing cells; and
   a seal formed between the non-display areas of the upper and lower substrates, the seal comprising a first elongation extending generally parallel to the first edge,
   wherein at least one of the connection lines comprises an extension made of a metal mesh that extends generally parallel to the first edge and overlaps the first elongation of the seal extending in a direction generally parallel to the first edge so that the metal mesh extends in the direction of the elongation of the seal.

2. The display device of claim 1, wherein the non-display area is divided into a first non-display area adjacent to the display area, and a second non-display area positioned outside the first non-display area when viewed in the viewing direction, wherein in the first non-display area the connection lines do not comprise extensions made of a metal mesh, whereas the metal mesh extension is present in the second non-display area.

3. The display device of claim 2, wherein the plurality of connection lines include first connection lines arranged over the first non-display area, and second connection lines arranged over the second non-display area when viewed in the viewing direction.

4. The display device of claim 3, wherein each of the second connection lines comprises a first connection portion electrically connected to one of the plurality of sensing cells, and a second connection portion electrically connected to the first connection portion and formed to overlap the sealing material when viewed in the viewing direction.

5. The display device of claim 4, wherein the second connection portion is made of a transparent conductive material.

6. The display device of claim 4, wherein the second connection portion is formed in the shape of a metal mesh.

7. The display device of claim 4, wherein the first connection portion is formed of the same material as the first connection lines.

8. The display device of claim 7, wherein the first connection portion and the first connection lines are made of an opaque low-resistance metal material.

9. The display device of claim 1, wherein the plurality of sensing cells include:
   first sensing cells arranged in row lines extending along a second direction;
   first connection patterns, each connecting immediately neighboring two of the first sensing cells arranged in one of the row lines;
   second sensing cells arranged in column lines extending along a third direction; and
   second connection patterns, each connecting immediately neighboring two of the second sensing cells arranged in one of the column lines.

10. The display device of claim 9, wherein the plurality of sensing cells are formed on the same layer.

11. The display device of claim 10, wherein the second sensing cells are integrally formed with the second connection patterns.

12. The display device of claim 11, further comprising an insulation layer interposed between the first and second connection patterns.

13. The display device of claim 9, wherein the plurality of sensing cells are formed on the major surface of the upper substrate.

14. The display device of claim 1, wherein the upper substrate is a sealing substrate of the display device which is an organic light emitting display device.

15. The display device of claim 1, further comprising:
   a polarizing film disposed over the upper substrate, wherein the sensing cells and the sensing lines are formed between the polarizing film and the upper substrate; and
   a window substrate disposed over the polarizing film.

16. The display device of claim 15, wherein a black matrix layer is formed over an area of the window substrate overlapping the non-display area when viewed in the viewing direction.

17. The display device of claim 15, wherein the polarizing film comprises a polarizer, a retardation compensation layer, and a transparent adhesive layer attaching the retardation compensation layer to the polarizer, and is flexible.

18. The display device of claim 15, wherein the window substrate is formed of at least one selected from the group consisting of polymethyl methacrylate (PMMA), acryl and polyester (PET).

* * * * *